US012617215B2

(12) United States Patent
Ominato et al.

(10) Patent No.: US 12,617,215 B2
(45) Date of Patent: May 5, 2026

(54) OPTICAL SCANNING APPARATUS AND IMAGE FORMING APPARATUS

(71) Applicant: BROTHER KOGYO KABUSHIKI KAISHA, Nagoya (JP)

(72) Inventors: Hiroyuki Ominato, Nagoya (JP); Hidetaka Hoshino, Nukata (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 250 days.

(21) Appl. No.: 18/615,211

(22) Filed: Mar. 25, 2024

(65) Prior Publication Data

US 2024/0326467 A1 Oct. 3, 2024

(30) Foreign Application Priority Data

Apr. 3, 2023 (JP) .................................. 2023-060338

(51) Int. Cl.
*B41J 2/47* (2006.01)
*G02B 26/12* (2006.01)
*G03G 15/04* (2006.01)
*G03G 15/043* (2006.01)

(52) U.S. Cl.
CPC .............. *B41J 2/471* (2013.01); *G02B 26/12* (2013.01); *G03G 15/04036* (2013.01); *G03G 15/0435* (2013.01); *B41J 2/473* (2013.01)

(58) Field of Classification Search
CPC ... B41J 2/473; B41J 2/471; B41J 2/47; G02B 26/123; G02B 26/125; G02B 3/0062
See application file for complete search history.

(56) References Cited

U.S. PATENT DOCUMENTS

| | | | |
|---|---|---|---|
| 6,563,624 B1 | 5/2003 | Ishihara | |
| 7,760,228 B2 * | 7/2010 | Mamiya | .................... B41J 2/473 |
| | | | 347/242 |
| 8,803,937 B2 * | 8/2014 | Kudo | .................... G02B 26/123 |
| | | | 347/261 |
| 10,325,188 B2 * | 6/2019 | Shirai | .................. H04N 1/0607 |
| 2005/0094234 A1 * | 5/2005 | Miyatake | ............. G02B 26/125 |
| | | | 359/220.1 |
| 2005/0179771 A1 | 8/2005 | Ueda | |

(Continued)

FOREIGN PATENT DOCUMENTS

| | | |
|---|---|---|
| JP | H09-197330 A | 7/1997 |
| JP | 2001-194610 A | 7/2001 |

(Continued)

*Primary Examiner* — John P Zimmermann
(74) *Attorney, Agent, or Firm* — Baker Botts L.L.P.

(57) ABSTRACT

An optical scanning apparatus includes a semiconductor laser, a coupling lens, a polygon mirror, a motor, an optical scanning system including a first scanning lens with an optical surface, a housing, a cover, and a partition with an opening closed with the first scanning lens. Shifting amounts of a focus position of a beam with respect to a reference imaging plane in a main scanning direction are in relations $\Delta A < 0$ and $\Delta A < \Delta B < \Delta C$, where $\Delta A$ mm and $\Delta B$ mm are shifting amounts when the semiconductor laser, the coupling lens, and the optical scanning system are at a normal ambient temperature and at an upper-limit ambient temperature, respectively, and $\Delta C$ mm is a shifting amount when the semiconductor laser and the coupling lens are at the normal ambient temperature and the first scanning lens is at a first temperature.

10 Claims, 9 Drawing Sheets

(56)  References Cited

U.S. PATENT DOCUMENTS

2006/0077500 A1      4/2006  Hayashi et al.
2013/0293659 A1*  11/2013  Suzuki ................. G02B 7/1821
                                                      347/118
2019/0061372 A1*    2/2019  Nakano ................ G02B 26/127
2019/0094747 A1*    3/2019  Yamamura ............. G02B 3/005
2019/0111706 A1*    4/2019  Kurihara ................. H04N 1/23
2019/0257983 A1*    8/2019  Yamamura ........... G02B 3/0075

FOREIGN PATENT DOCUMENTS

JP          2005-258392  A      9/2005
JP          2006-235069  A      9/2006
JP          2013-076807  A      4/2013

* cited by examiner

NEGATIVE ⟵ ⟶ POSITIVE

| Temperature(°C) | | | | | | |
|---|---|---|---|---|---|---|
| Semiconductor Laser | Coupling Lens | Cylindrical Lens | First Scanner Lens | | Second Scanner Lens | |
| | | | First Side | Second Side | | |
| -5 | -5 | -5 | 25 | 15 | -5 | With local temperature increase |
| 25 | 25 | 25 | 55 | 45 | 25 | |
| 55 | 55 | 55 | 85 | 75 | 55 | |
| -5 | -5 | -5 | -5 | -5 | -5 | Without local temperature increase |
| 25 | 25 | 25 | 25 | 25 | 25 | |
| 55 | 55 | 55 | 55 | 55 | 55 | |

| Ambient temperature [°C] | Wavelength of semiconductor laser [nm] | Local temperature increase | Shifting amount of focus position with respect to reference imaging plane in main scanning direction [mm] | |
|---|---|---|---|---|
| -5 | 777 | NO | -0.330 | ΔD |
| 25 | 785 | NO | -0.500 | ΔA |
| 55 | 793 | NO | -0.330 | ΔB |
| -5 | 777 | YES | 0.590 | |
| 25 | 785 | YES | 0.504 | ΔC |
| 55 | 793 | YES | 0.480 | |

FIG. 11

OPTICAL SCANNING APPARATUS AND IMAGE FORMING APPARATUS

REFERENCE TO RELATED APPLICATIONS

This application claims priority from Japanese Patent Application No. 2023-060338, filed on Apr. 3, 2023. The entire content of the priority application is incorporated herein by reference.

BACKGROUND ART

In an optical scanning apparatus, a focus position may shift due to changes in ambient temperature, but the shifting amount may be offset by applying a diffractive optical element in an optical system. Such an optical scanning apparatus may have a first imaging optical system, which condenses a beam emitted from a light source, and a second imaging optical system, which scans an imaging plane with the beam deflected by a deflection device, and in either the first imaging optical system or the second imaging optical system, at least one refractive optical element and one diffractive optical element may be provided. By setting a power of the diffractive optical element suitably, the shifting behavior of the focus position on the imaging plane due to changes of oscillation wavelength of the light from the light source and the shifting behavior of the focus position on the imaging plane due to the ambient temperature changes may be corrected.

SUMMARY

The optical scanning apparatus may have a box-shaped housing, one side of which is open, and the first imaging optical system, a polygon mirror being a deflector, and the second imaging optical system may be supported by the housing. A cover may close the opening of the housing. A motor for driving the polygon mirror may be stowed alongside the polygon mirror in the housing. The motor running active may generate heat to increase the temperature inside the optical scanning apparatus.

Meanwhile, if the polygon mirror is tainted with dust or foreign particles contained in the exterior air, reflectance of the polygon mirror may be lowered. As such, deficiencies such as printing errors and inability of obtaining timing to start printing may be caused, and lifetime of the optical scanning apparatus may be shortened. Therefore, in order to prevent the polygon mirror from being tainted, the polygon mirror may be surrounded by partitions so that an area around the polygon mirror may be enclosed securely.

In such an arrangement, an opening may be formed in one of the partitions, and a first scanning lens being one of the lenses in an optical scanning system located closest to the polygon mirror may be set in the opening. However, with the first scanning lens located in proximity to the polygon mirror, in other words, in proximity to the motor, a temperature of the first scanning lens may be locally increased by the heat from the motor to be higher than the other parts of the optical system.

In the known optical scanning apparatus, such local temperature increase due to the arrangement may not be taken into consideration; therefore, the focus position tends to shift largely. When the focus position is movable by a large amount, a diameter of a beam spot on the imaging plane may vary largely, and an imaging quality may be lowered.

The present disclosure relates to an optical scanning apparatus, which may reduce taints on a polygon mirror and may reduce variation of a beam spot diameter on an imaging plane to form a qualified image.

According to an aspect of the present disclosure, an optical scanning apparatus an optical scanning apparatus includes a semiconductor laser, a coupling lens, a polygon mirror, a motor, an optical scanning system, a housing, a cover, a partition. The coupling lens is made of resin and has a diffractive optical element on at least one surface thereof. The coupling lens is configured to convert light emitted from the semiconductor laser into a beam. The polygon mirror is configured to deflect the beam into a main scanning direction. The motor is configured to rotate the polygon mirror. The optical scanning system is configured to focus the beam deflected by the polygon mirror on an imaging plane. The optical scanning system includes a first scanning lens made of resin. The housing retains the semiconductor laser, the coupling lens, the polygon mirror, the motor, and the optical scanning system. The housing includes a base on one side thereof in an axial direction, which is a direction of a rotation axis of the polygon mirror. The cover covers the other side of the housing in the axial direction. The partition encloses a space where the polygon mirror and the motor are located between the base and the cover. The partition has an opening, through which the deflected beam passes. The first scanning lens closes the opening. The first scanning lens has an optical surface located closest to the polygon mirror among a plurality of optical surfaces included in the optical scanning system. Shifting amounts of a focus position of the beam with respect to a reference imaging plane in the main scanning direction are in relations $\Delta A<0$ and $\Delta A<\Delta B<\Delta C$, where $\Delta A$ mm is a shifting amount in a case where the semiconductor laser, the coupling lens, and the optical scanning system are at a normal ambient temperature; $\Delta B$ mm is a shifting amount in a case where the semiconductor laser, the coupling lens, and the optical scanning system are at an upper-limit ambient temperature; and $\Delta C$ mm is a shifting amount in a case where the semiconductor laser and the coupling lens are at the normal ambient temperature and the first scanning lens is at a first temperature. The first temperature is higher than the normal ambient temperature.

According to another aspect of the present disclosure, an image forming apparatus configured to form an image on a recording sheet includes a photosensitive member, a developing device, a transfer device, and an optical scanning apparatus. The photosensitive member is configured to form an electrostatic latent image thereon. The developing device is configured to supply a developer to the electrostatic latent image to form a developed image on the photosensitive member. The transfer device is configured to transfer the developed image onto the recording sheet. The optical scanning apparatus includes a semiconductor laser, a coupling lens, a polygon mirror, a motor, an optical scanning system, a housing, a cover, and a partition. The coupling lens is made of resin and has a diffractive optical element on at least one side thereof. The coupling lens is configured to convert light emitted from the semiconductor laser into a beam. The polygon mirror is configured to deflect the beam into a main scanning direction. The motor is configured to rotate the polygon mirror. The optical scanning system is configured to focus the beam deflected by the polygon mirror on the photosensitive member. The optical scanning system includes a first scanning lens made of resin. The housing retains the semiconductor laser, the coupling lens, the polygon mirror, the motor, and the optical scanning system. The housing includes a base on one side thereof in an axial direction, which is a direction of a rotation axis of the polygon mirror. The cover covers the other side of the housing in the axial direction. The partition encloses a space where the polygon mirror and the motor are located between the base and the cover. The partition has an opening, through which the deflected beam passes. The first scanning lens closes the opening. The first scanning lens has an optical surface located closest to the polygon mirror among a plurality of optical surfaces included in the optical scanning system. Shifting amounts of a focus position of the beam with respect to a reference imaging plane in the main scanning direction are in relations $\Delta A<0$ and $\Delta A<\Delta B<\Delta C$, where $\Delta A$ mm is a shifting amount in a case where the semiconductor laser, the coupling lens, and the optical scanning system are at a normal ambient temperature; $\Delta B$ mm is a shifting amount in a case where the semiconductor laser, the coupling lens, and the optical scanning system are at an upper-limit ambient temperature; and $\Delta C$ mm is a shifting amount in a case where the semiconductor laser and the coupling lens are at the normal ambient temperature and the first scanning lens is at a first temperature. The first temperature is higher than the normal ambient temperature.

BRIEF DESCRIPTION OF DRAWINGS

FIG. 11 is a table to illustrate shifting amounts of the focus position in the main scanning direction on a reference imaging plane in the optical scanning apparatus.

DESCRIPTION

An embodiment of the present disclosure will be described below.

Image Forming Apparatus

Figure 1:
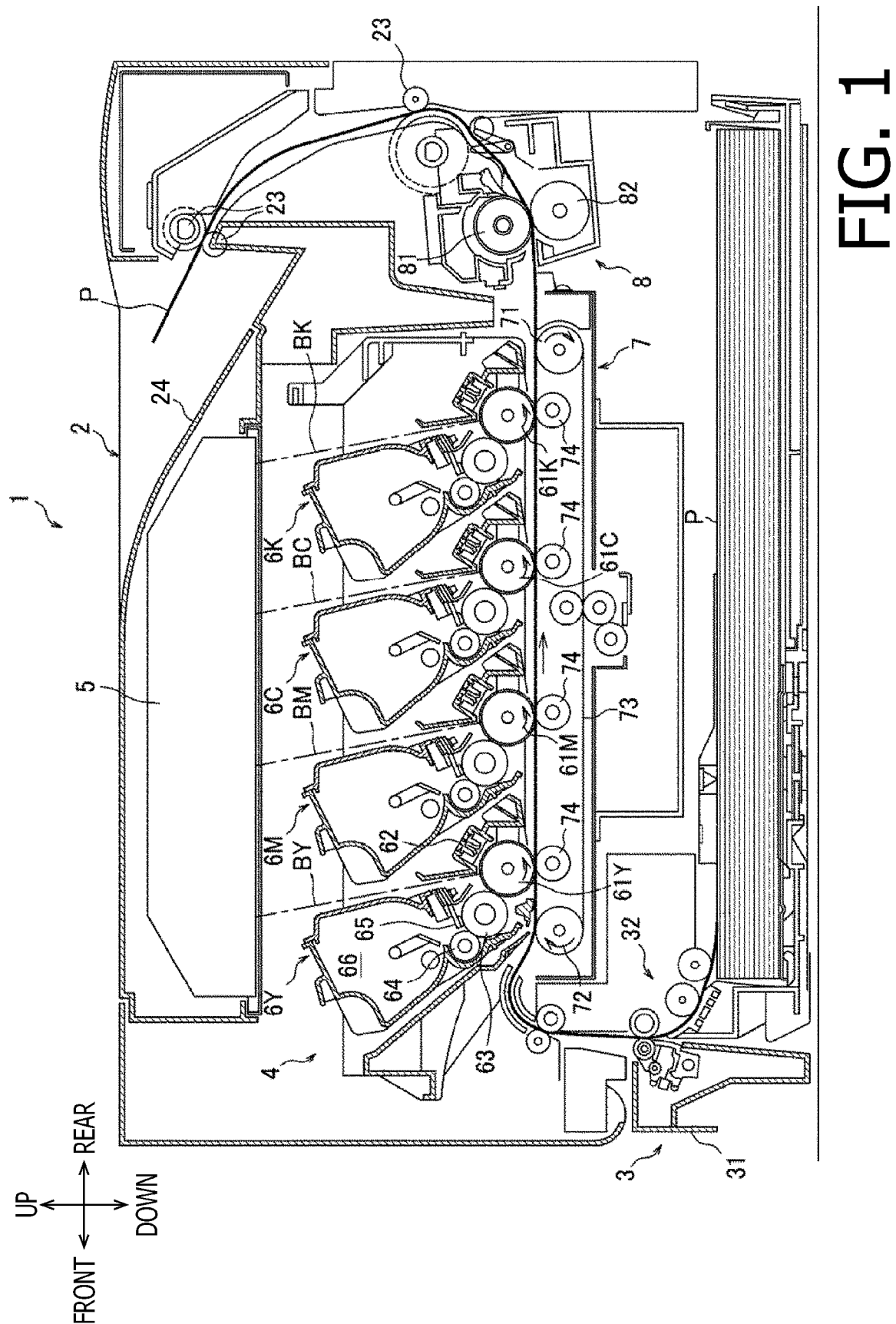
FIG. 1 is an overall cross-sectional view of a color laser printer.

FIG. 1 is an overall cross-sectional view of a color laser printer 1 being an example of the image forming apparatus. As shown in FIG. 1, an optical scanning apparatus 5 according to the embodiment of the present disclosure is usable in the color laser printer 1. The color laser printer 1 incudes a main housing 2, which accommodates a sheet feeder 3 and an image forming device 4. The sheet feeder 3 may feed recording sheets P to the image forming device 4, and the image forming device 4 may form images on the recording sheets P fed by the sheet feeder 3.

The image forming device 4 includes the optical scanning apparatus 5, four process units 6Y, 6M, 6C, 6K, a transfer unit 7, and a fuser unit 8.

The sheet feeder 3 is located at a lower position in the main housing 2. The sheet feeder 3 includes a feeder tray 31 to store the recording sheets P and a sheet feeding assembly 32 to supply the recording sheets P from the feeder tray 31 to the image forming device 4. The recording sheets P in the feeder tray 31 may be separated from one another by the sheet feeding assembly 32 and supplied separately to the image forming device 4.

The optical scanning apparatus 5 is located at an upper position in the main housing 2. The optical scanning apparatus 5 may emit beams BY, BM, BC, BK at surfaces of photosensitive members 61Y, 61M, 61C, 61K, which are provided to the process units 6Y, 6M, 6C, 6K, respectively, based on print data to selectively expose the surfaces of the photosensitive members 61Y, 61M, 61C, 61K and form electrostatic latent images in the exposed regions on the surfaces of the photosensitive members 61Y, 61M, 61C, 61K. In the context below, the surfaces of the photosensitive members 61Y, 61M, 61C, 61K may be called imaging planes. The photosensitive members 61Y, 61M, 61C, 61K may be photosensitive drums, each of which has a cylindrical form extending in a direction of width of the color laser printer 1 and includes a photosensitive layer. In the context below, the direction in which the photosensitive members 61Y, 61M, 61C, 61K extend may be called a widthwise direction.

The four process units 6Y, 6M, 6C, 6K are arrayed in tandem along a front-rear direction between the feeder tray 31 and the optical scanning apparatus 5. In the context below, a direction along a front-to-rear or rear-to-front direction of the color laser printer 1 may be called a front-rear direction. The process unit 6Y includes the photosensitive member 61Y, the process unit 6M includes the photosensitive member 61M, the process unit 6C includes the photosensitive member 61C, and the process unit 6K includes the photosensitive member 61K.

Moreover, each of the process units 6Y, 6M, 6C, 6K includes a charger 62, a developing roller 63, a feeder roller 64, a flattening blade 65, and a developing-agent container 66 for containing a developing agent. The developing agent may be a positively-chargeable mono-component dry toner. In the present embodiment, the developing roller 63, the feeder roller 64, the flattening blade 65, and the developing-agent container form a developing device.

In the present embodiment, including this text and the accompanying drawings, for identifying the parts or the members, e.g., the photosensitive members 61, in the color laser printer 1, specifically by the colors of the developing agents contained therein, signs Y, M, C, K denoting yellow, magenta, cyan, and black, respectively, are appended to the reference numbers. In other words, when the same parts or the same members do not need to be identified specifically by the colors of the developing agent contained therein, the parts or the members may be referred to by a single reference number without the signs Y, M, C, K. The four process units 6Y, 6M, 6C, 6K are aligned in this recited order from upstream to downstream in a conveying direction, in which the recording sheet P is conveyed in the main housing 2.

A transfer unit 7 is located between the feeder tray 31 and the process units 6. The transfer unit 7 includes a driving roller 71, a driven roller 72, a conveyer belt 73 being an endless belt strained around the driving roller 71 and the driven roller 72, and four transfer rollers 74. The conveyer belt 73 contacts the photosensitive members 61 on an upper outer surface thereof. The transfer roller 74 is located on an inner side of the conveyer belt 73. The photosensitive members 61 and the transfer roller 74 nip the upper part of the conveyer belt 73 in there-between.

The fuser unit 8 is located rearward with respect to the process units 6 and the transfer unit 7. The fuser unit 8 includes a heat roller 81 and a pressure roller 82, which is located to face the heat roller 81 and applies pressure to the heat roller 81.

In the image forming device 4, the surface of each photosensitive member 61 may be evenly charged positively by the charger 62 and exposed to the beam B from the optical scanning apparatus 5 based on the print data, and thereby the electrostatic latent image may be formed on the surface of the photosensitive member 61. To the electrostatic latent image formed on the surface of the photosensitive member 61, the developing agent carried on the developing roller 63 may be supplied, and thereby the electrostatic latent image may be visualized, and an image may be formed in the developing agent on the photosensitive member 61.

The recording sheet P fed from the sheet feeder 3 may move rearward on the conveyer belt 73, contacting the photosensitive members 61 one after another. As the recording sheet P passes through the positions between the photosensitive members 61 and the transfer rollers 74, the images formed on the photosensitive members 61 in the developing agents may be transferred from the photosensitive members 61 to the recording sheet P in layers. Further, as the recording sheet P with the images in the developing agents formed thereon passes through a position between the heat roller 81 and the pressure roller 82 in the fuser unit 8, the developing agents are thermally fixed onto the recording sheets P, and the recording sheet P may be conveyed by conveyer rollers 23 outside the main housing 2 to rest on an ejection tray 24.

It is to be noted that the embodiment of the present disclosure may not necessarily be limited to the color laser printer with the four process units 6Y, 6M, 6C, 6K, but the present disclosure may be applied to a monochrome laser printer with solely the process unit 6K for the color of black.

Optical Scanning Apparatus

Figure 2:
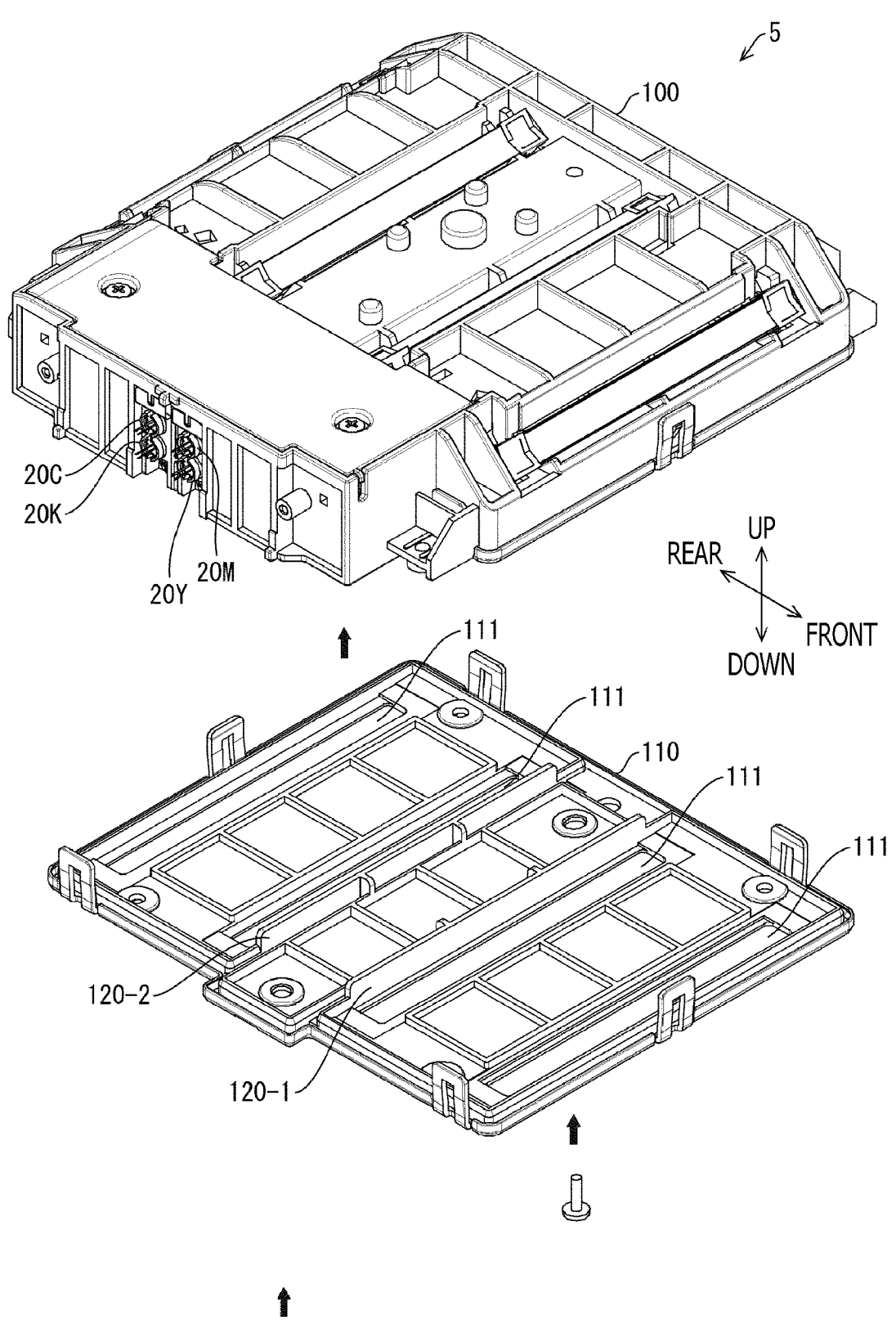
FIG. 2 is an exploded view of an optical scanning apparatus.
Figure 3:
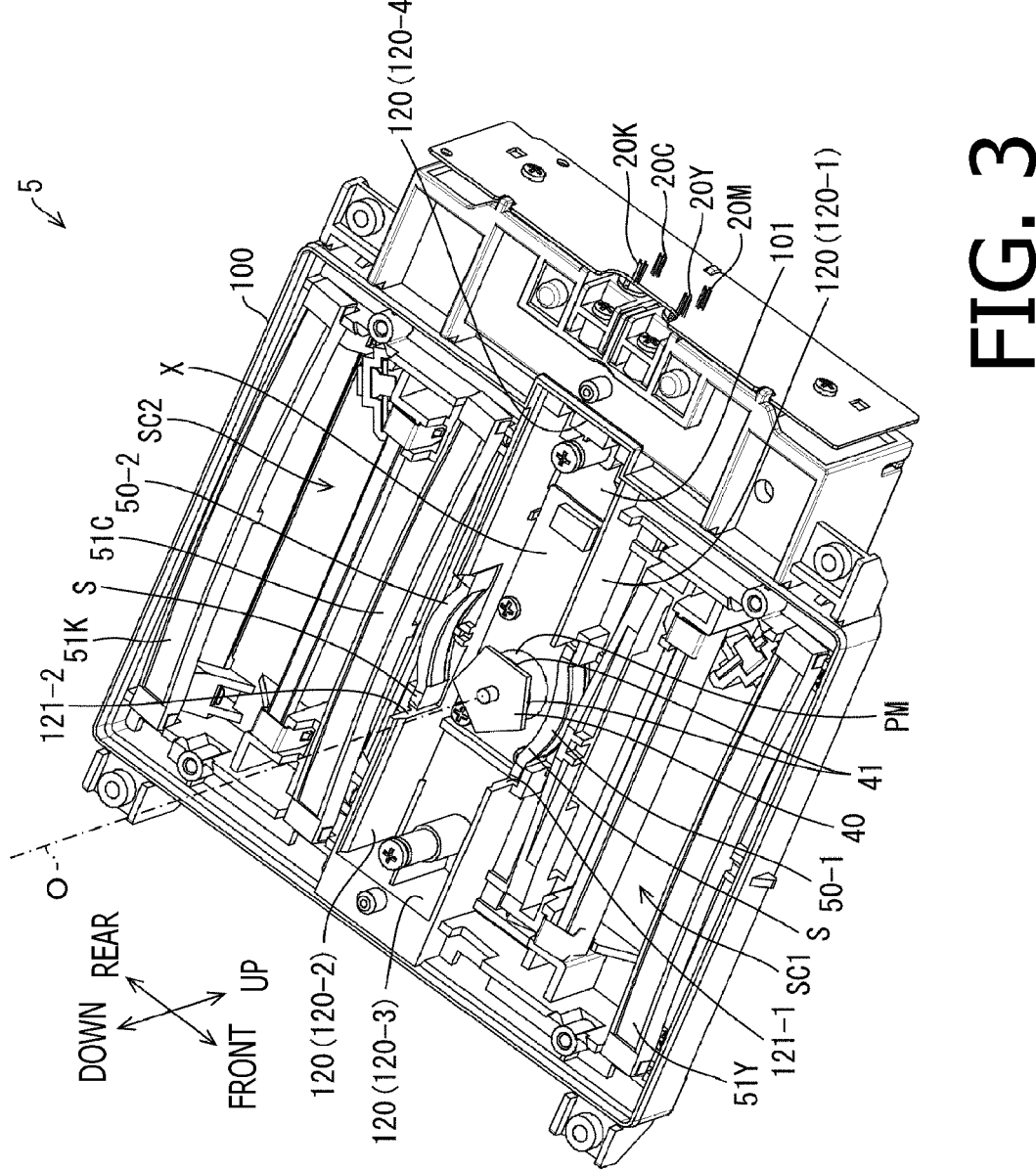
FIG. 3 is a perspective view of the optical scanning apparatus without a cover.
Figure 4:
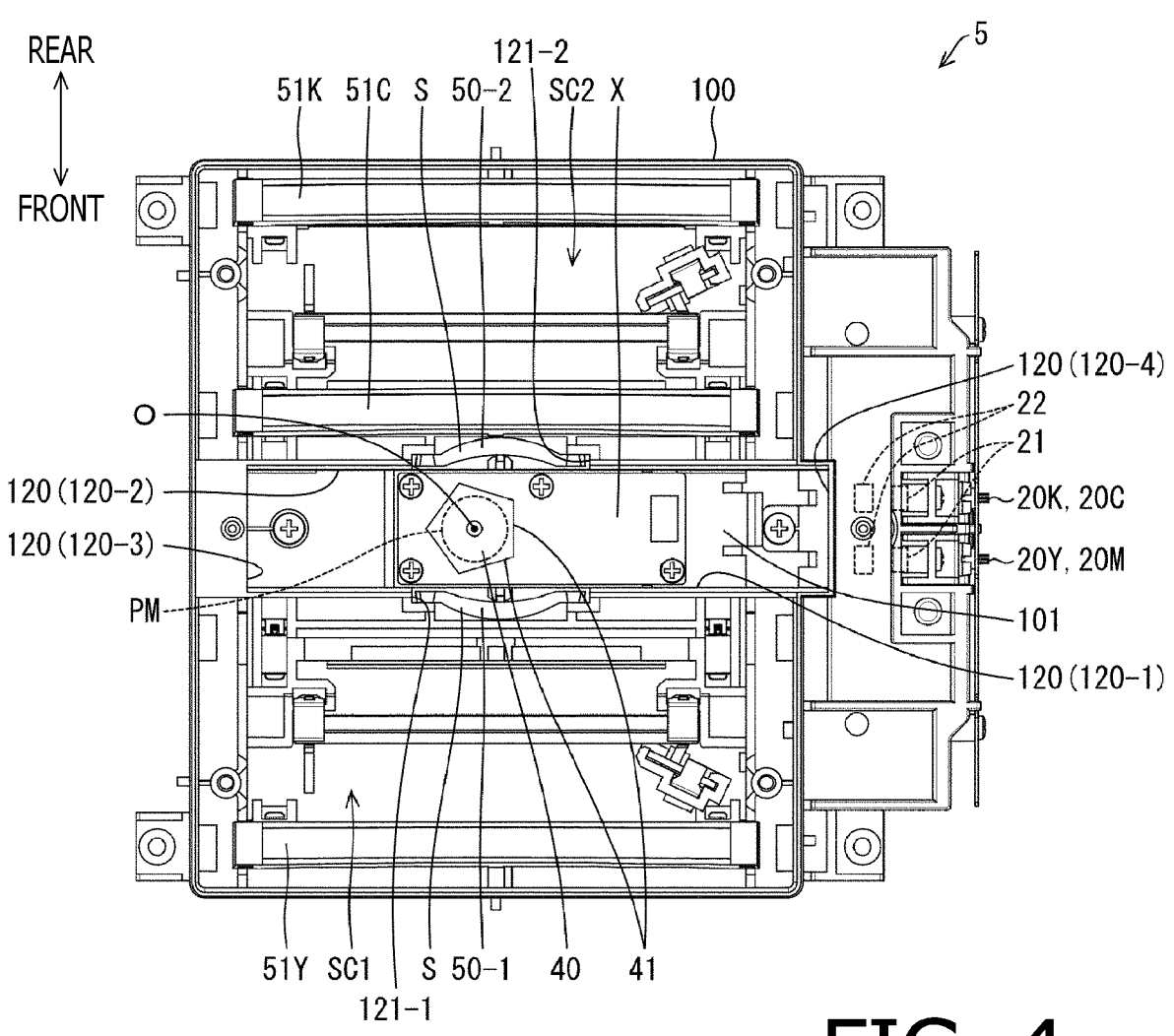
FIG. 4 is a plan view of the optical scanning apparatus without the cover.
Figure 5:
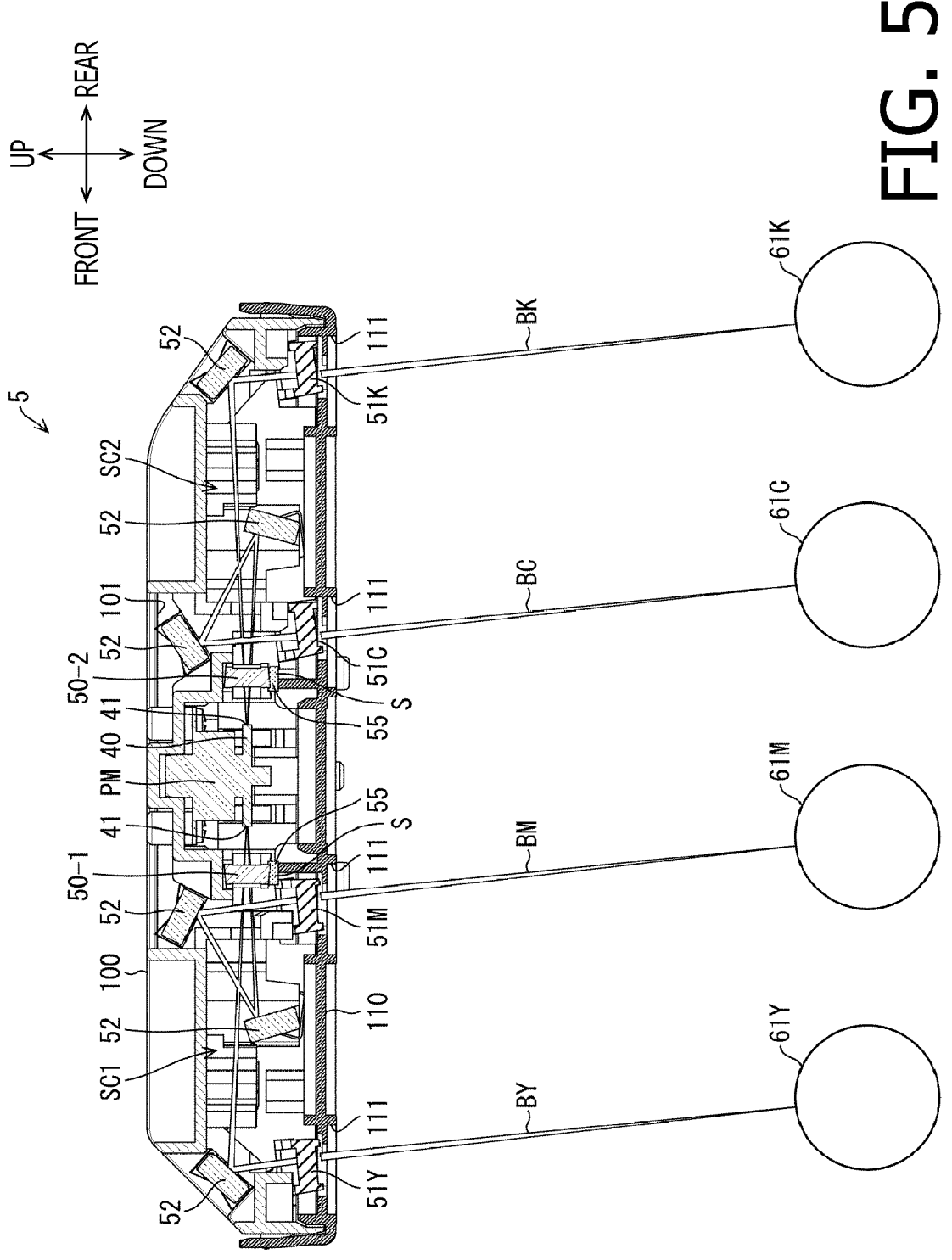
FIG. 5 is a cross-sectional view of the optical scanning apparatus.

Next, the optical scanning apparatus 5 will be described. FIG. 2 is an exploded view of the optical scanning apparatus 5. FIG. 3 is a perspective view of the optical scanning apparatus 5 without a cover 110. FIG. 4 is a plan view of the optical scanning apparatus 5 without the cover 110. FIG. 5 is a cross-sectional view of the optical scanning apparatus 5. FIGS. 3 and 4 show the optical scanning apparatus 5 in an orientation to face downward when the optical scanning apparatus 5 is mounted in the color laser printer 1.

As shown in FIGS. 2-4, the optical scanning apparatus 5 includes a housing 100, the cover 110, four semiconductor lasers 20Y, 20M, 20C, 20K, coupling lenses 21, cylindrical lenses 22, a polygon mirror 40, a first optical scanning system SC1, and a second optical scanning system SC2. The second optical scanning system SC2 is located opposite to the first optical scanning system SC1 across a rotation axis O of the polygon mirror 40 in the front-rear direction of the color laser printer 1.

The housing 10 retains the semiconductor lasers 20Y, 20M, 20C, 20K, the coupling lenses 21, 21, the cylindrical lenses 22, 22, the polygon mirror 40, and the first and second optical scanning systems SC1, SC2. The housing 100 is made of resin and has a form of a short box, one side of which opposite to a base 101 is open. The housing 100 is in an orientation such that the base 101 is on an upper side and an opening is on a lower side. In other words, the housing 100 is open downward. The base 101 is an approximately rectangular-shaped board in a view along the rotation axis O of the polygon mirror 40. In the context below, the direction along the rotation axis O may be called an axial direction. The base 101 is located on one side of the housing 100 in the axial direction. In the present embodiment, the axial direction coincides with a vertical direction of the color laser printer 1.

The cover 110 is located on the open side of the housing 100 and covers the opening of the housing 100. The cover 110 is located on the other side of the housing 100 opposite to the base 101 in the axial direction. The cover 110 is formed of resin and may be fixed to the housing 100 with, for example, screws. In the cover 110, four windows 111 for the beams BY, BM, BC, BK to pass there-through are formed.

The semiconductor lasers 20Y, 20M, 20C, 20K are devices that may emit laser light to form the beams BY, BM, BC, BK. Four (4) semiconductor lasers 20Y, 20M, 20C, 20K are provided in one-to-one correspondence to the four (4) photosensitive members 61Y, 61M, 61C, 61K (see FIGS. 1 and 5), which are to be scanned with and exposed to the beams BY, BM, BC, BK, respectively.

The laser light emitted from each of the semiconductor lasers 20Y, 20M, 20C, 20K passes through the coupling lenses 21 and the cylindrical lenses 22 shown in FIG. 4 and enters the polygon mirror 40. The beams BY, BM being the laser light emitted from the semiconductor lasers 20Y, 20M are deflected by the polygon mirror 40 toward the first optical scanning system SC1. The beams BC, BK being the laser light emitted from the semiconductor lasers 20C, 20K are deflected by the polygon mirror 40 toward the second optical scanning system SC2.

The coupling lenses 21 convert the laser light emitted diverging from the semiconductor lasers 20Y, 20M, 20C, 20K to the beams BY, BM, BC, BK. Four (4) coupling lenses 21 are provided in one-to-one correspondence to the four (4) semiconductor lasers 20Y, 20M, 20C, 20K. The beams BY, BM, BC, BK being the converted outcome may be any of collimated, converged, and diverged beams. Each coupling lens 21 is made of resin and includes a refractive optical element that converts the laser light to a beam. Further, each coupling lens 21 in the present embodiment has a diffractive optical element on at least one side thereof. The diffractive optical element on the coupling lens 21 will be described further below.

The cylindrical lenses 22 are lenses for correcting face tangle errors of the polygon mirror 40 and refract and converge the beams BY, BM, BC, BK in a sub-scanning direction to form linear images that extend in a main-scanning direction on deflection surfaces 41 of the polygon mirror 40. The cylindrical lenses 22 are each located in between the coupling lens 21 and the polygon mirror 40. In the exemplary arrangement shown in FIG. 4, two (2) cylindrical lenses 22 are provided to four (4) semiconductor lasers 20Y, 20M, 20C, 20K; however, the number of the cylindrical lenses 22 may not necessarily be limited to two. For example, four (4) cylindrical lenses 22 may be provided to the semiconductor lasers 20Y, 20M, 20C, 20K in one-to-one basis.

The polygon mirror 40 is a deflector and is located at an approximately center of the housing 100 to face the semiconductor lasers 20Y, 20M, 20C, 20K. The polygon mirror 40 has five (5) deflection surfaces 41 located at positions equally distanced from the rotation axis O. The polygon mirror 40 is connected with a motor PM. The polygon mirror 40 driven by the motor PM may rotate about the rotation axis O, and the deflection surfaces 41 may reflect and deflect the beams BY, BM, BC, BK into the main scanning direction.

The first optical scanning system SC1 is an optical imaging system for focusing the beams BY, BM deflected by the polygon mirror 40 on the photosensitive members 61Y, 61M. The first optical scanning system SC1 includes a first scanning lens 50-1, two (2) second scanning lenses 51Y, 51M, and a plurality of reflection mirrors 52. For easier understanding, in FIGS. 3-4, illustration of the second scanning lens 51M is omitted. The first scanning lens 50-1 has a first surface 50A (see FIG. 6), which is on an inner side closer to the motor MP, and a second surface 50B (see FIG. 6), which is on an outer and farther side from the motor MP.

The second optical scanning system SC2 is an optical imaging system for focusing beams BC, BK deflected by the polygon mirror 40 on the photosensitive members 61C, 61K. The second optical scanning system SC2 includes a first scanning lens 50-2, two (2) second scanning lenses 51C, 51K, and a plurality of reflection mirrors 52. The first scanning lens 50-2 has a first surface 50A (see FIG. 6), which is on an inner side closer to the motor MP, and a second surface 50B (see FIG. 6), which is on an outer and farther side from the motor MP.

The first scanning lenses 50-1, 50-2 and the second scanning lenses 51Y, 51M, 51C, 51K are all fθ lenses. The first scanning lenses 50-1, 50-2 have a larger optical power in the main scanning direction than optical power of the second scanning lenses 51Y, 51M, 51C, 51K in the main scanning direction. The first scanning lenses 50-1, 50-2 are axisymmetric lenses. The first scanning lenses 50-1, 50-2 have the optical power in the main scanning direction dominantly in the first optical scanning system SC1 and the second optical scanning system SC2, respectively. The second scanning lenses 51Y, 51M, 51C, 51K are face-tangle error correcting lenses, through which the polygon mirror 40 and the imaging planes are conjugate, in the sub-scanning direction. The second scanning lenses 51Y, 51M and 51C, 51K have the optical power in the sub-scanning direction dominantly in the first optical scanning system SC1 and the second optical scanning system SC2, respectively.

As shown in FIG. 5, the beams BY, BM deflected by the polygon mirror 40 pass through the first scanning lens 50-1 and are reflected by the corresponding reflection mirrors 52 in the first optical scanning system SC1, pass through the second scanning lenses 51Y, 51M, and scan the surfaces of the photosensitive members 61Y, 61M, respectively.

The beams BC, BK deflected by the polygon mirror 40 pass through the first scanning lens 50-2 and are reflected by the corresponding reflection mirrors 52 in the second optical scanning system SC2, pass through the second scanning lenses 51C, 51K, and scan the surfaces of the photosensitive members 61C, 61K, respectively.

Structure Around Polygon Mirror

A structure around the polygon mirror 40 will be described below with reference to FIGS. 2-5. As shown in FIGS. 3-4, the optical scanning apparatus 5 includes a partition 120, which enclose a space X including the polygon mirror 40 and the motor PM at a position in the housing 100 between the base 101 and the cover 110.

In particular, the partition 120 includes partitions 120-1, 120-2, 120-3, 120-4. The partition 120-1 separates the polygon mirror 40 from the first optical scanning system SC1, the second partition 120-2 separates the polygon mirror 40 from the second optical scanning system SC2, and the partitions 120-3, 120-4 connect ends of the partition 120-1 and the partition 120-2 on each side in a direction intersecting orthogonally with the axial direction.

In the partition 120-1, an opening 121-1, through which the deflected beams BY, BM may pass, is formed. The first scanning lens 50-1 is attached to edges of the opening 121-1. The first scanning lens 50-1 has the first surface 50A, which is located closest to the polygon mirror 40 among a plurality of optical surfaces included in the first optical scanning system SC1. The opening 121-1 is closed with the first scanning lens 50-1.

In the partition 120-2, an opening 121-2, through which the deflected beams BC, BK may pass, is formed. The first scanning lens 50-2 is attached to edges of the opening 121-2. The first scanning lens 50-2 has the first surface 50A, which is located closest to the polygon mirror 40 among a plurality of optical surfaces provided in the second optical scanning system SC2. The opening 121-2 is closed with the first scanning lens 50-2.

In this structure, the exterior air to enter the space X, in which the polygon mirror 40 and the motor PM are located, may be reduced, and taint on the polygon mirror 40 may be reduced.

The partition 120 is a wall extending along the axial direction and is either in contact or connected with the base 101 of the housing 100 on the ends thereof on one side in the axial direction. Optionally, the end of partition 120 on the other side in the axial direction may be either in contact or connected with the cover 110. With the partition 120 being in contact or connected with the base 101, and optionally with the cover 110, the space X may be sealed substantially or tightly. Therefore, the polygon mirror 40 may be prevented from being tainted effectively.

For example, the partition 120 may be formed separately from the housing 100 and from the cover 110 and may be attached to the housing 100, and to the cover 110, optionally, later. Optionally, for another example, the partition 120 may be formed integrally with both or either of the housing 100 and/or the cover 110. In the present embodiment, the housing 100 and the cover 110 are each formed to have partition parts that protrude in the axial direction from the base 101 and from an inner surface 112 (see FIG. 2), respectively, and the partition parts extending downward from the base 101 and the partition parts extending upward from the inner surface 112 may abut in the axial direction to form the partitions 120-1, 120-2. By forming the partition 120 integrally with the housing 100 and/or the cover 110, a number of processes and a number of parts to assemble the optical scanning apparatus 5 may be reduced.

In the arrangement where the first scanning lenses 50-1, 50-2 are attached to the edges of the openings 121-1, 121-2, the first scanning lenses 50-1, 50-2 are mounted at the positions defined by the housing 100. As such, in order to reduce influence of deviation in the housing 100 on the positions of the first scanning lenses 50-1, 50-2, gaps S as shown in FIG. 3 are formed between the cover 110 and edges of the first scanning lenses 50-1, 50-2 on the side facing the cover 110. In this arrangement, however, the gaps S may provide pathways to the exterior air to enter the space X.

Therefore, in the present embodiment, as shown in FIG. 5, sponges 55 are arranged in the gaps S so that the sponges 55 may close the gaps S in the state where the cover 110 is attached to the housing 100. The sponges 55 may be adhered to either the first scanning lenses 50-1, 50-2 or the edges of the partition parts to form the partitions 120-1, 120-2 at the positions corresponding to the first scanning lenses 50-1, 50-2 in advance so that a number of processes and a number of parts to assemble the optical scanning apparatus 5 may be reduced.

Temperature Compensation

Figure 6:
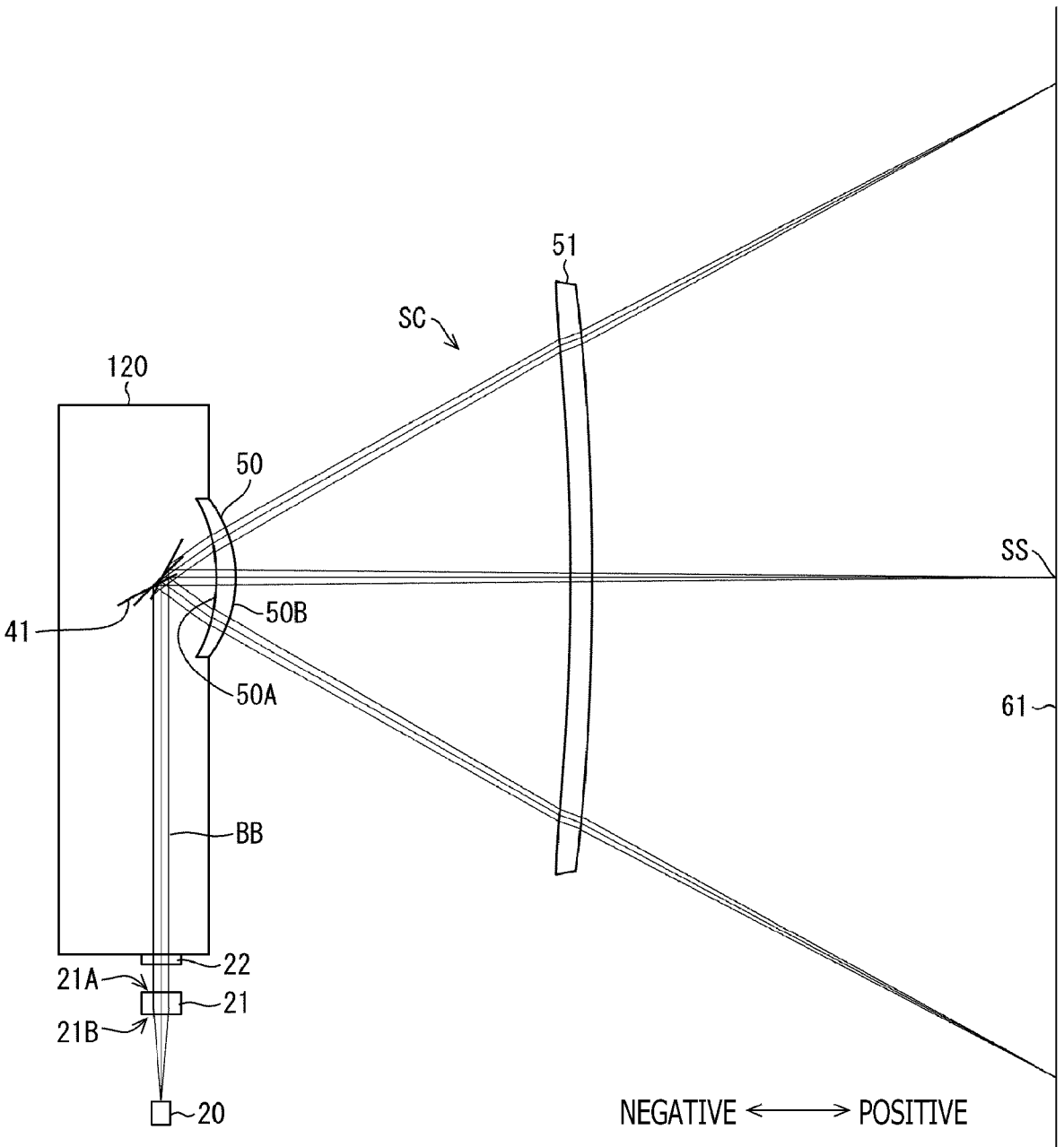
FIG. 6 is a schematic illustration of temperature compensation in the optical scanning apparatus.

Next, with reference to FIG. 6, temperature compensation in the optical scanning apparatus 5 to offset the influence of the shifting behavior of the focus positions due to ambient temperature changes will be described. FIG. 6 is a schematic illustration of temperature compensation in the optical scanning apparatus 5. The mechanism of the temperature compensation in conjunction with the semiconductor lasers 20Y, 20M, 20C, 20K, the optical scanning systems SC1, SC2, the first scanning lenses 50-1, 50-2, the second scanning lenses 51-1, 51-2, the photosensitive members 61Y, 61M, 61C, 61K, and the beams BY, BM, BC, BK is not differed by the colors of the developing agents but is the same regardless of the colors. Therefore, in the description below, the semiconductor laser 20, the optical scanning system SC, the first scanning lens 50, the second scanning lens 51, the photosensitive member 61, and the beam BB in the singular form will represent the semiconductor lasers 20Y, 20M, 20C, 20K, the optical scanning systems SC1, SC2, the first scanning lenses 50-1, 50-2, the second scanning lenses 51-1, 51-2, the photosensitive members 61Y, 61M, 61C, 61K, and the beams BY, BM, BC, BK, respectively.

As shown in FIG. 6, the coupling lens 21 has a refractive optical element 21A and a diffractive optical element 21B. In particular, the coupling lens 21 is a lens made of resin, of which exit surface is a refractive surface having positive power, and of which incident surface is a diffraction surface having positive power. The coupling lens 21 converts the laser light emitted from the semiconductor laser 20 into the beam BB with the power of the refractive optical element 21A and the power of the diffractive optical element 21B. Moreover, when the ambient temperature increases, the power of the diffractive optical element 21B increases due to changes in the oscillation wavelength of the laser light emitted from the semiconductor laser 20 and changes in a grating pitch of the diffractive optical element 21B. As such, the coupling lens 21 is adapted to compensate for the shifting of the focus position such that the shifting amount when the semiconductor laser 20, the coupling lens 21, and the optical scanning system SC are at an upper-limit ambient temperature is adjusted to $\Delta B$ mm. In the present embodiment, $\Delta B$ mm is a shifting amount with respect to a scanning central position SS. The reference imaging plane is an imaging plane when the shifting amount of the focus position is zero (0). The shifting amount $\Delta B$ mm is a value, by which the beam spot diameter on the imaging plane may stay within a range to provide a substantially fine quality for forming the image, even if the focus position is shifted by the amount.

Factors that may cause shifting of the focus position due to the changes in the ambient temperature may include changes in the oscillation wavelength of the laser light emitted from the semiconductor laser 20 due to the temperature, expansion or contraction of the lenses due to the temperature, and linear expansion of the parts retaining the lenses such as the housing 100.

When the ambient temperature increases, the focus position of the optical scanning system SC shifts toward a positive side with respect to the reference imaging plane, but the shifting of the focus position may be offset by increasing the power of the coupling lens 21. According to the configuration described above, by setting the power of the diffractive optical element 21B suitably, the shifting of the focus position in the main scanning direction may be offset to stay within $\Delta B$ mm as long as the increased ambient temperature is lower than or equal to the upper-limit ambient temperature so that the changes of the beam spot diameter on the imaging plane may be reduced, and the image in the substantially fine quality may be formed. It may be noted that in the present embodiment the focus position is adjusted in the main scanning direction in consideration of the impact of the shifting on the imaging quality, which tends to be greater than shifting of the focus position in the sub-scanning direction.

Moreover, when the ambient temperature decreases, the power of the diffractive optical element 21B decreases due to changes in the oscillation wavelength of the laser light emitted from the semiconductor laser 20 and changes in the grating pitch of the diffractive optical element 21B. As such, the coupling lens 21 may be adapted to compensate for the shifting of the focus position such that the shifting amount, when the semiconductor laser 20, the coupling lens 21, and the corresponding one of the first and second optical scanning systems SC1, SC2 are at a lower-limit ambient temperature, is adjusted to $\Delta D$ mm. The shifting amount $\Delta D$ mm is a value, by which the beam spot diameter on the imaging plane may stay within a range to provide a substantially fine quality for forming the image, even if the focus position is shifted by the amount.

When the ambient temperature decreases, as well as the case where the ambient temperature increases, the focus position of the optical scanning system SC may shift toward the positive side with respect to the reference imaging plane, but the shifting of the focus position may be offset by increasing the power of the coupling lens 21. According to the configuration described above, by setting the power of the diffractive optical element 21B suitably, the shifting of the focus position in the main scanning direction may be offset to stay within $\Delta D$ mm as long as the decreased ambient temperature is higher than or equal to the lower-limit ambient temperature so that the changes of the beam spot diameter on the imaging plane may be reduced, and the image in the substantially fine quality may be formed.

The upper-limit ambient temperature is an upper-limit value within an operable temperature range for the optical scanning apparatus 5, and the lower-limit ambient temperature is a lower-limit value within the operatable temperature range for the optical scanning apparatus 5. If, for example, the operable temperature range for the optical scanning apparatus 5 is ±30° C. from a normal ambient temperature 25° C., the upper-ambient temperature is 55° C., and the lower-limit ambient temperature is −5° C.

Measures Against Local Temperature Increase

With reference to FIGS. 6-11, measures against local temperature increase in the optical scanning apparatus 5 will be described below. As described above, in the optical scanning apparatus 5, the partition 120 encloses the space X, including the polygon mirror 40 and the motor PM, are provided, and the first scanning lenses 50 are attached to the edges of the openings 121-1 and the opening 121-2 in the partition 120. Therefore, while the space X may be sealed substantially, the polygon mirror 40 may be prevented from being tainted effectively.

According to this configuration, however, heat from the motor PM may cause local temperature increase in the first scanning lens 50, in other words, the temperature of the first scanning lens 50 may be increased to be higher than the other devices in the optical system, which are, for example, the coupling lens 21, the cylindrical lens 22, and the second scanning lens 51.

Figures 7, 8:
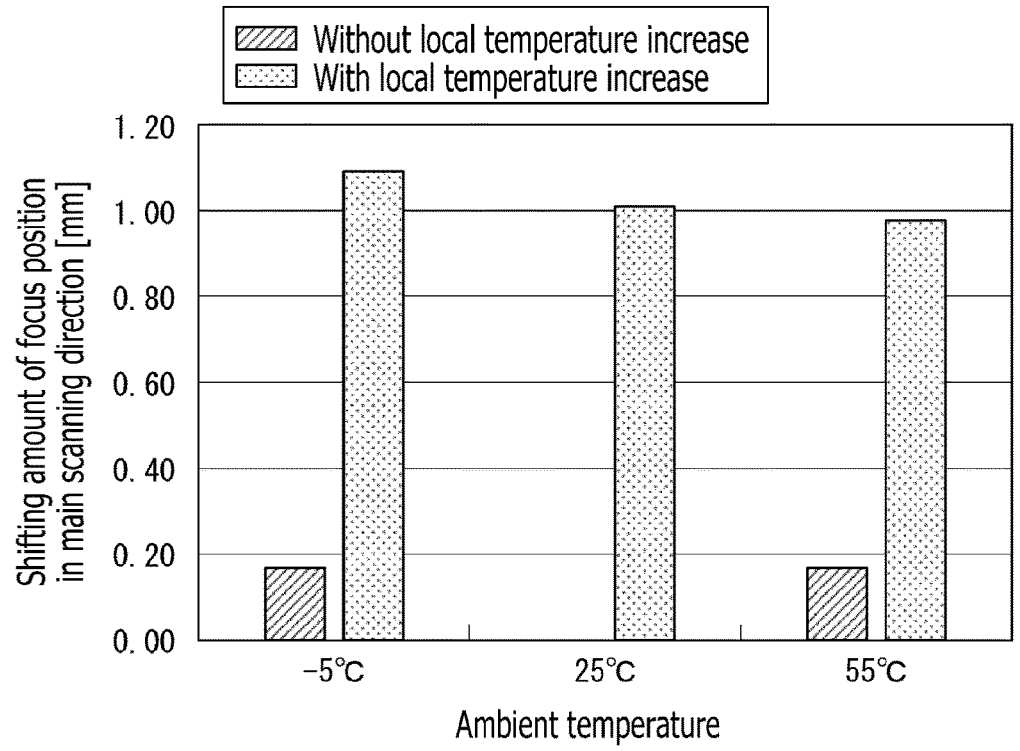
FIG. 7 is a table to illustrate analytic temperature conditions with and without local temperature increase in device in the optical scanning apparatus.
FIG. 8 is a chart to illustrate shifting amounts of a focus position in a main scanning direction under the analytic temperature conditions illustrated in FIG. 7.

FIG. 7 is a table to illustrate analytic temperature conditions with and without the local temperature increase in the device in the optical scanning apparatus 5. The analysis by the inventors of the present disclosure finds that, when the temperature of the first scanning lens 50 increases, the temperature is higher on the first surface 50A, which is on the inner side closer to the motor MP being the heat source, than the second surface 50B, which is on the outer and farther side from the motor MP.

Therefore, the analysis is based on a condition, in which the temperatures of the first scanning lens 50 on the first surface 50A and the second surface 50B are differed by 10° C., as shown in FIG. 7. Under this condition, the temperature of the first scanning lens 50 alone is increased to be higher than the other devices in the optical system and the semiconductor laser 20. The temperatures of the other devices in the optical system and the semiconductor laser 20 are assumed to stay steady without changing from the ambient temperature, while the temperature of the first surface 50A is increased by 30° C. from the ambient temperature, and the temperature of the second surface 50B is increased by 20° C. from the ambient temperature. For the ambient temperature, the normal ambient temperature being 25° C., the upper-limit ambient temperature being 55° C., which is 30° C. higher than the normal ambient temperature, and the lower-limit ambient temperature being –5° C., which is 30 degrees lower than the normal ambient temperature, are adopted.

FIG. 8 is a chart to illustrate the shifting amounts of the focus position in the main scanning direction under the analytic temperature conditions illustrated in FIG. 7. The values adopted in the analysis are those under the setting where the diffraction power is set suitably to offset the shifting of the focus position caused by the ambient temperature changes under the temperature conditions without the local temperature increase shown in FIG. 7. The shifting amounts under the condition without the local temperature increase are zero (0) when the normal ambient temperature is 25° C., and 0.17 mm when the upper-limit ambient temperature is 55° C. and when the lower-limit ambient temperature is –5° C.

Under the condition without the local temperature increase, even if the temperature changes between –5° C. and 55° C., the shifting amount of the focus position in the main scanning direction with respect to the reference imaging plane may be maintained within a range between 0 and 0.17 mm.

On the other hand, under the condition with the local temperature increase, the shifting amount of the focus position in the main scanning direction with respect to the reference imaging plane increases approximately to 1.00 mm, as shown in FIG. 8. In the example shown in FIG. 8, at the lower-limit ambient temperature, the focus position may shift as much as approximately 1.10 mm.

As such, the analysis finds, while the semiconductor laser 20 and the coupling lens 21 are at the ambient temperature, when the temperature in the resin-made first scanning lens 50 located closer to the heat source is increased to a first temperature which is higher than the ambient temperature, in other words, when the local temperature increase is caused in the first scanning lens 50, the focus position shifts toward the positive side to be farther beyond the reference imaging plane. As the shifting amount of the focus position with respect to the reference imaging plane increases, the image-forming quality of the color laser printer 1 may be lowered. Therefore, measures may need to be taken against the local temperature increase.

Figure 9:
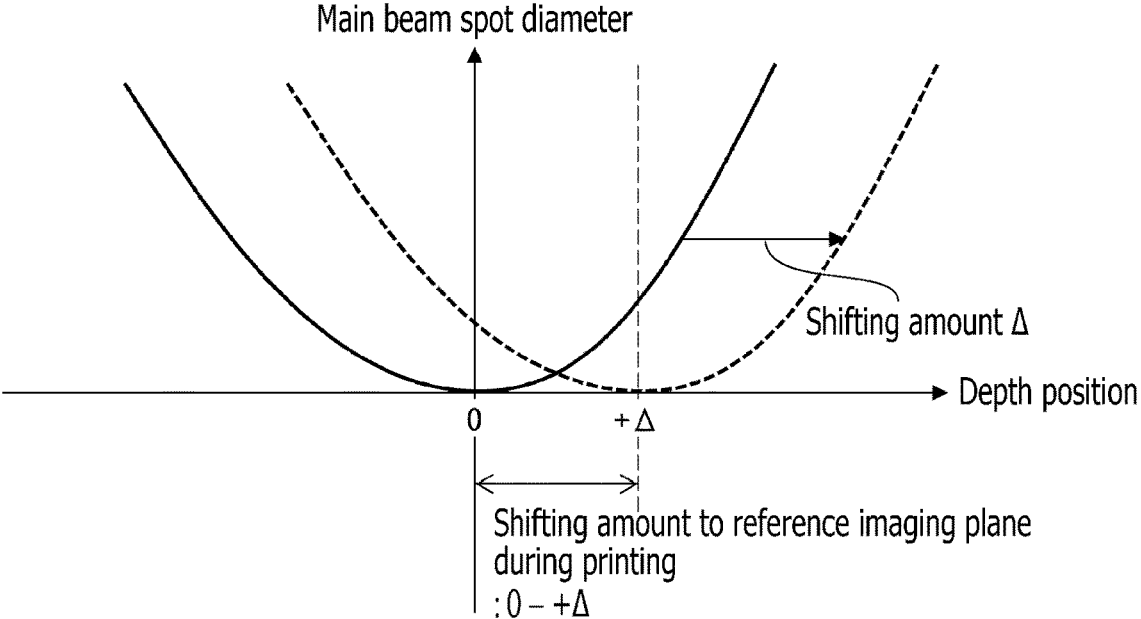
FIG. 9 illustrates relations between a beam spot diameter and a depth position in the main scanning direction before and after the local temperature increase at a normal ambient temperature, with the focus position before the local temperature increase being located at a depth position zero.
Figure 10:
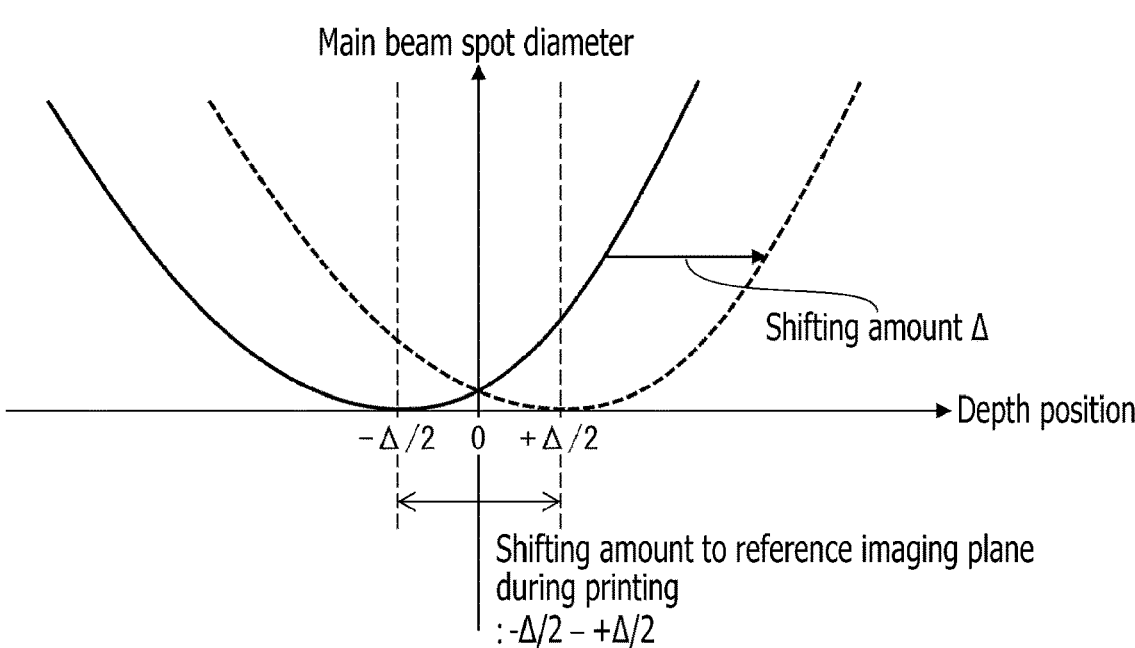
FIG. 10 illustrates relations between the beam spot diameter and the depth position in the main scanning direction before and after the local temperature increase at the normal ambient temperature, with the focus position before the local temperature increase being located at a depth position on a negative side.

FIGS. 9 and 10 illustrate relations between the beam spot diameter in the main scanning direction and a depth position when the ambient temperature is at the normal ambient temperature. In particular, FIG. 9 illustrates the relations before the local temperature increase occurs when the focus position in the main scanning direction is set at a depth position zero (0). The depth position zero is on the reference imaging plane. When the local temperature increase occurs, the focus position shifts toward the positive side from the depth position zero. The shifting amount is represented by a sign A, and with the focus position before the local temperature increase being set to the depth position zero, the shifting amount of the focus position with respect to the reference imaging plane when the color laser printer 1 is printing is in a range between zero to A.

In contrast, FIG. 10 illustrates the relations between the beam spot diameter in the main scanning direction and the depth position before the local temperature increase occurs when the focus position in the main scanning direction is set at $-\Delta/2$. In this setting, when the local temperature increase occurs and the focus position shifts toward the positive side, the shifting amount is $\Delta/2$. Therefore, by setting the focus position before the local temperature increase at $-\Delta/2$, the shifting amount of the focus position with respect to the reference imaging plane when the color laser printer 1 is printing falls within a range between $-\Delta/2$ and $\Delta/2$, and variation of the beam spot diameter may be reduced.

As such, in the optical scanning apparatus 5, the focus position in the main scanning direction is set in consideration of the shifting amount of the focus position in the main scanning direction with the local temperature increase. In other words, $\Delta A$ mm, $\Delta B$ mm, $\Delta C$ mm being the shifting amounts of the focus position in the main scanning direction with respect to the reference imaging plane are set to satisfy relativities $\Delta A<0$, $\Delta C>0$, and $\Delta A<\Delta B<\Delta C$.

$\Delta A$ mm is a shifting amount of the focus position in the main scanning direction with respect to the reference imaging plane when the semiconductor laser 20, the coupling lens 21, and the optical scanning system SC are at the normal ambient temperature. As described earlier, $\Delta B$ mm is the shifting amount of the focus position when the semiconductor laser 20, the coupling lens 21, and the optical scanning system SC are at the upper-limit ambient temperature, which is corrected to be reduced by the diffraction power of the coupling lens 21. $\Delta C$ mm is the shifting amount of the focus position when the semiconductor laser 20, the coupling lens 21, and the optical scanning system SC are at the normal ambient temperature and when the first scanning lens 50 is at the predetermined first temperature, which is higher than the normal ambient temperature. Optionally, the first temperature of the first scanning lens 50 may be 30° C. higher than the ambient temperature on the first surface 50A and 20° C. higher than the ambient temperature on the second surface 50B.

According to the configuration described above, $\Delta A$ being the shifting amount of the focus position in the main scanning direction with respect to the reference imaging plane at the regular ambient temperature is set to satisfy relations $\Delta A<0$ so that the focus position is located on the negative side in the main scanning direction, in other words, the beam BB may focus at a position short from the reference imaging plane. As such, by setting the focus position on the negative side in the main scanning direction, when the local temperature increase occurs and the focal length is increased, the shifting amount of the focus position from the reference imaging plane may be reduced, and variation of the beam spot diameter may be reduced.

Moreover, according to the configuration described above, $\Delta B$ representing the shifting amount of the focus position when the ambient temperature is at the upper-limit ambient temperature is adjusted to fall within the range between $\Delta A$, which is the position farthest on the negative side from the reference imaging plane, and $\Delta C$, which is the position farthest on the positive side, to satisfy the relations $\Delta A<\Delta B<\Delta C$. As such, while variation of the beam spot diameter at the upper-limit ambient temperature may be compensated as before, influence of the variation of the beam spot diameter due the local temperature increase may be minimized.

Optionally, the optical scanning apparatus 5 may be configured to satisfy the relations $\Delta A<\Delta D<\Delta C$. As described above, $\Delta D$ mm is the shifting amount of the focus position with respect to the reference imaging plane in the main scanning direction when the semiconductor laser 20, the coupling lens 21, and the optical scanning system SC are at the lower-limit ambient temperature, corrected to be reduced by the diffraction power of the coupling lens 21.

Therefore, $\Delta D$ representing the shifting amount of the focus position when the ambient temperature is at the lower-limit ambient temperature is adjusted to fall within the range between $\Delta A$, which is the position farthest on the negative side from the reference imaging plane, and $\Delta C$, which is the position farthest on the positive side from the reference imaging plane, to satisfy relations $\Delta A<\Delta D<\Delta C$. As such, while variation of the beam spot diameter at the lower-limit ambient temperature may be compensated as before, influence of the variation of the beam spot diameter due the local temperature increase may be minimized.

FIG. 11 is a table to illustrate the shifting amounts of the focus position in the main scanning direction on the reference imaging plane in the optical scanning apparatus 5. According to this example, the shifting amount $\Delta A$ mm of the focus position with respect to the reference imaging plane in the main scanning direction is $-0.500$ mm under the condition where the ambient temperature is at 25° C. being the normal ambient temperature and where the local temperature increase is not caused. The shifting amount $\Delta D$ mm of the focus position with respect to the reference imaging plane in the main scanning direction is $-0.330$ mm under the condition where the ambient temperature is at $-5$° C. being the lower-limit ambient temperature and where the local temperature increase is not caused. The shifting amount $\Delta B$ mm of the focus position with respect to the reference imaging plane in the main scanning direction is $-0.330$ mm under the condition where the ambient temperature is at 55° C. being the upper-limit ambient temperature and where the local temperature increase is not caused.

On the other hand, the shifting amount $\Delta C$ mm of the focus position with respect to the reference imaging plane in the main scanning direction is $-0.504$ mm under the condition where the ambient temperature is at 25° C. being the normal ambient temperature and where local temperature increase is caused. A shifting amount of the focus position with respect to the reference imaging plane in the main scanning direction is $-0.590$ mm under the condition where the ambient temperature is at $-5$° C. being the lower-limit ambient temperature and where local temperature increase is caused. A shifting amount of the focus position with respect to the reference imaging plane in the main scanning direction is $-0.480$ mm under the condition where the ambient temperature is at 55° C. being the upper-limit ambient temperature and where local temperature increase is caused.

While the invention has been described in conjunction with the example structure outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. For example, the coupling lens 21 may not necessarily has both the diffractive optical element and the refractive optical element but may have the refractive optical element alone.

What is claimed is:

1. An optical scanning apparatus, comprising:

a semiconductor laser;

a coupling lens made of resin, the coupling lens having a diffractive optical element on at least one surface thereof, the coupling lens being configured to convert light emitted from the semiconductor laser into a beam;

a polygon mirror configured to deflect the beam into a main scanning direction;

a motor configured to rotate the polygon mirror;

an optical scanning system configured to focus the beam deflected by the polygon mirror on an imaging plane, the optical scanning system including a first scanning lens made of resin;

a housing retaining the semiconductor laser, the coupling lens, the polygon mirror, the motor, and the optical scanning system, the housing including a base on one side thereof in an axial direction, the axial direction being a direction of a rotation axis of the polygon mirror;

a cover covering the other side of the housing in the axial direction; and a partition enclosing a space where the polygon mirror and the motor are located between the base and the cover, the partition having an opening, through which the deflected beam passes, wherein the first scanning lens closes the opening, the first scanning lens having an optical surface located closest to the polygon mirror among a plurality of optical surfaces included in the optical scanning system, and wherein shifting amounts of a focus position of the beam with respect to a reference imaging plane in the main scanning direction are in relations $\Delta A<0$ and $\Delta A<\Delta B<\Delta C$, where $\Delta A$ mm is a shifting amount in a case where the semiconductor laser, the coupling lens, and the optical scanning system are at a normal ambient temperature, $\Delta B$ mm is a shifting amount in a case where the semiconductor laser, the coupling lens, and the optical scanning system are at an upper-limit ambient temperature, and $\Delta C$ mm is a shifting amount in a case where the semiconductor laser and the coupling lens are at the normal ambient temperature and the first scanning lens is at a first temperature, the first temperature being higher than the normal ambient temperature.

2. The optical scanning apparatus according to claim 1, wherein the shifting amounts are in relations $\Delta A<\Delta D<\Delta C$, where $\Delta D$ mm is a shifting amount in a case where the semiconductor laser, the coupling lens, and the optical scanning system are at a lower-limit ambient temperature.

3. The optical scanning apparatus according to claim 1, wherein the optical scanning system includes a second scanning lens located closer to the imaging plane than the first scanning lens, and the first scanning lens has optical power in the main scanning direction greater than optical power in the main scanning direction of the second scanning lens.

4. The optical scanning apparatus according to claim 1, wherein the partition is a wall extending along the axial direction, the partition being in contact or connection with the base on one end thereof on the one side in the axial direction and in contact or connection with the cover on the other end thereof on the other side in the axial direction.

5. The optical scanning apparatus according to claim 4, wherein the partition is formed integrally with the housing.

6. An image forming apparatus configured to form an image on a recording sheet, comprising:

a photosensitive member configured to form an electrostatic latent image thereon;

a developing device configured to supply a developer to the electrostatic latent image to form a developed image on the photosensitive member;

a transfer device configured to transfer the developed image onto the recording sheet; and an optical scanning apparatus, comprising:

a semiconductor laser;

a coupling lens made of resin, the coupling lens having a diffractive optical element on at least one side thereof, the coupling lens being configured to convert light emitted from the semiconductor laser into a beam;

a polygon mirror configured to deflect the beam into a main scanning direction;

a motor configured to rotate the polygon mirror;

an optical scanning system configured to focus the beam deflected by the polygon mirror on the photosensitive member, the optical scanning system including a first scanning lens made of resin;

a housing retaining the semiconductor laser, the coupling lens, the polygon mirror, the motor, and the optical scanning system, the housing including a base on one side thereof in an axial direction, the axial direction being a direction of a rotation axis of the polygon mirror;

a cover covering the other side of the housing in the axial direction; and a partition enclosing a space where the polygon mirror and the motor are located between the base and the cover, the partition having an opening, through which the deflected beam passes, wherein the first scanning lens closes the opening, the first scanning lens having an optical surface located closest to the polygon mirror among a plurality of optical surfaces included in the optical scanning system, and wherein shifting amounts of a focus position of the beam with respect to a reference imaging plane in the main scanning direction are in relations $\Delta A<0$ and $\Delta A<\Delta B<\Delta C$, where $\Delta A$ mm is a shifting amount in a case where the semiconductor laser, the coupling lens, and the optical scanning system are at a normal ambient temperature, $\Delta B$ mm is a shifting amount in a case where the semiconductor laser, the coupling lens, and the optical scanning system are at an upper-limit ambient temperature, and $\Delta C$ mm is a shifting amount in a case where the semiconductor laser and the coupling lens are at the normal ambient temperature and the first scanning lens is at a first temperature, the first temperature being higher than the normal ambient temperature.

7. The image forming apparatus according to claim 6, wherein the shifting amounts are in relations $\Delta A<\Delta D<\Delta C$, where $\Delta D$ mm is a shifting amount in a case where the semiconductor laser, the coupling lens, and the optical scanning system are at a lower-limit ambient temperature.

8. The image forming apparatus according to claim 6, wherein the optical scanning system includes a second scanning lens located closer to the photosensitive member than the first scanning lens, and the first scanning lens has optical power in the main scanning direction greater than optical power in the main scanning direction of the second scanning lens.

9. The image forming apparatus according to claim 6, wherein the partition is a wall extending along the axial direction, the partition being in contact or connection with the base on one end thereof on the one side in the axial direction and in contact or connection with the cover on the other end thereof on the other side in the axial direction.

10. The image forming apparatus according to claim 9, wherein the partition is formed integrally with the housing.

* * * * *